US011979735B2

(12) United States Patent
Giron

(10) Patent No.: US 11,979,735 B2
(45) Date of Patent: May 7, 2024

(54) APPARATUS, METHOD, SOUND SYSTEM

(71) Applicant: Sony Group Corporation, Tokyo (JP)

(72) Inventor: Franck Giron, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 172 days.

(21) Appl. No.: 17/440,793

(22) PCT Filed: Mar. 27, 2020

(86) PCT No.: PCT/EP2020/058752
§ 371 (c)(1),
(2) Date: Sep. 20, 2021

(87) PCT Pub. No.: WO2020/201107
PCT Pub. Date: Oct. 8, 2020

(65) Prior Publication Data

US 2022/0167109 A1 May 26, 2022

(30) Foreign Application Priority Data

Mar. 29, 2019 (EP) .................................... 19166287

(51) Int. Cl.
*H04S 7/00* (2006.01)

(52) U.S. Cl.
CPC .......... *H04S 7/303* (2013.01); *H04S 2420/01* (2013.01)

(58) Field of Classification Search
CPC ....... H04S 7/303; H04S 2420/01; H04S 5/005
See application file for complete search history.

(56) References Cited

U.S. PATENT DOCUMENTS

2016/0037282 A1 2/2016 Giron
2017/0127211 A1 5/2017 Crockett et al.
2017/0325043 A1 11/2017 Jot et al.
2018/0262858 A1* 9/2018 Noh ........................ H04S 7/302
2019/0116445 A1* 4/2019 Gerrard .................. H04S 7/303

FOREIGN PATENT DOCUMENTS

CN 103081512 A 5/2013
CN 104604255 A 5/2015
WO 2011/152044 A1 12/2011

(Continued)

OTHER PUBLICATIONS

International Search Report and Written Opinion dated May 6, 2020, received for PCT Application PCT/EP2020/058752, Filed on Mar. 27, 2020, 11 pages.

(Continued)

*Primary Examiner* — David L Ton
(74) *Attorney, Agent, or Firm* — XSENSUS LLP

(57) ABSTRACT

The present disclosure pertains to an apparatus, which has circuitry configured to control a loud-speaker arrangement including at least one virtual loudspeaker and at least one real loudspeaker to generate at least one virtual sound source, wherein the at least one virtual sound source is generated based on contributions of the at least one virtual loudspeaker and the at least one real loudspeaker, and wherein a soundfield modulation function configured to generate an acoustic impression for a user is used to modulate a soundfield emitted by the virtual sound source, such that the acoustic impression is generated at a predetermined position.

20 Claims, 8 Drawing Sheets

(56) References Cited

FOREIGN PATENT DOCUMENTS

| | | | | | |
|---|---|---|---|---|---|
| WO | WO-2012005507 | A2 * | 1/2012 | ............... | H04R 5/02 |
| WO | 2017/119320 | A1 | 7/2017 | | |

OTHER PUBLICATIONS

Lopez et al., "Influence of the Listening Position in the Perception of Elevated Sources in Wave-Field Synthesis", AES 40th International Conference, Oct. 8-10, 2010, pp. 1-7.

Lee et al., "Virtual Height Speaker Rendering for Samsung 10.2-channel Vertical Surround System", Audio Engineering Society Convention Paper 8523, Oct. 20-23, 2011, pp. 1-10.

* cited by examiner

APPARATUS, METHOD, SOUND SYSTEM

CROSS-REFERENCE TO RELATED APPLICATIONS

The present application is based on PCT filing PCT/EP2020/058752, filed Mar. 27, 2020, which claims priority to EP 19166287.3, filed Mar. 29, 2019, the entire contents of each are incorporated herein by reference.

TECHNICAL FIELD

The present disclosure generally pertains to an apparatus, a method, and a sound system for generating a height impression of a sound for a user.

TECHNICAL BACKGROUND

Generally, known audio systems may use a large number of loudspeakers, e.g., due to the increasing request on hardware like new amplifier channels and loudspeakers themselves.

For rendering a height impression, which is now required in formats like Dolby Atmos, DTS-X, Auro-3D, and also bottom (i.e. "negative" height impression) for NHK, or 360RA, or the like, the current approach is to use additional speakers, placed at a certain altitude, ceiling reflections, or speakers on the floor. Such approaches require cabling and fixing and may not be optimal in view of aesthetic considerations.

Other approaches, such as sound-bars, typically reduce the system to a frontal one. However, such systems may have a limited sweet spot, which is mainly located on the axis orthogonal to the device.

SUMMARY

Therefore, it is generally desirable to provide an improved apparatus and a method for providing an audio output.

According to a first aspect the disclosure provides an apparatus comprising circuitry configured to control a loudspeaker arrangement including at least one virtual loudspeaker and at least one real loudspeaker to generate at least one virtual sound source, wherein the at least one virtual sound source is generated based on contributions of the at least one virtual loudspeaker and the at least one real loudspeaker, and wherein a soundfield modulation function configured to generate an acoustic impression for a user is used to modulate a soundfield emitted by the virtual sound source such that the acoustic impression is generated at a predetermined position.

According to a second aspect the disclosure provides a method comprising: controlling a loudspeaker arrangement including at least one virtual loudspeaker and at least one real loudspeaker to generate at least one virtual sound source, wherein the at least one virtual sound source is generated based on contributions of the at least one virtual loudspeaker and the at least one real loudspeaker, and wherein a soundfield modulation function configured to generate an acoustic impression for a user is used to modulate a soundfield emitted by the virtual sound source, such that the acoustic impression is generated at a predetermined position.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 6:
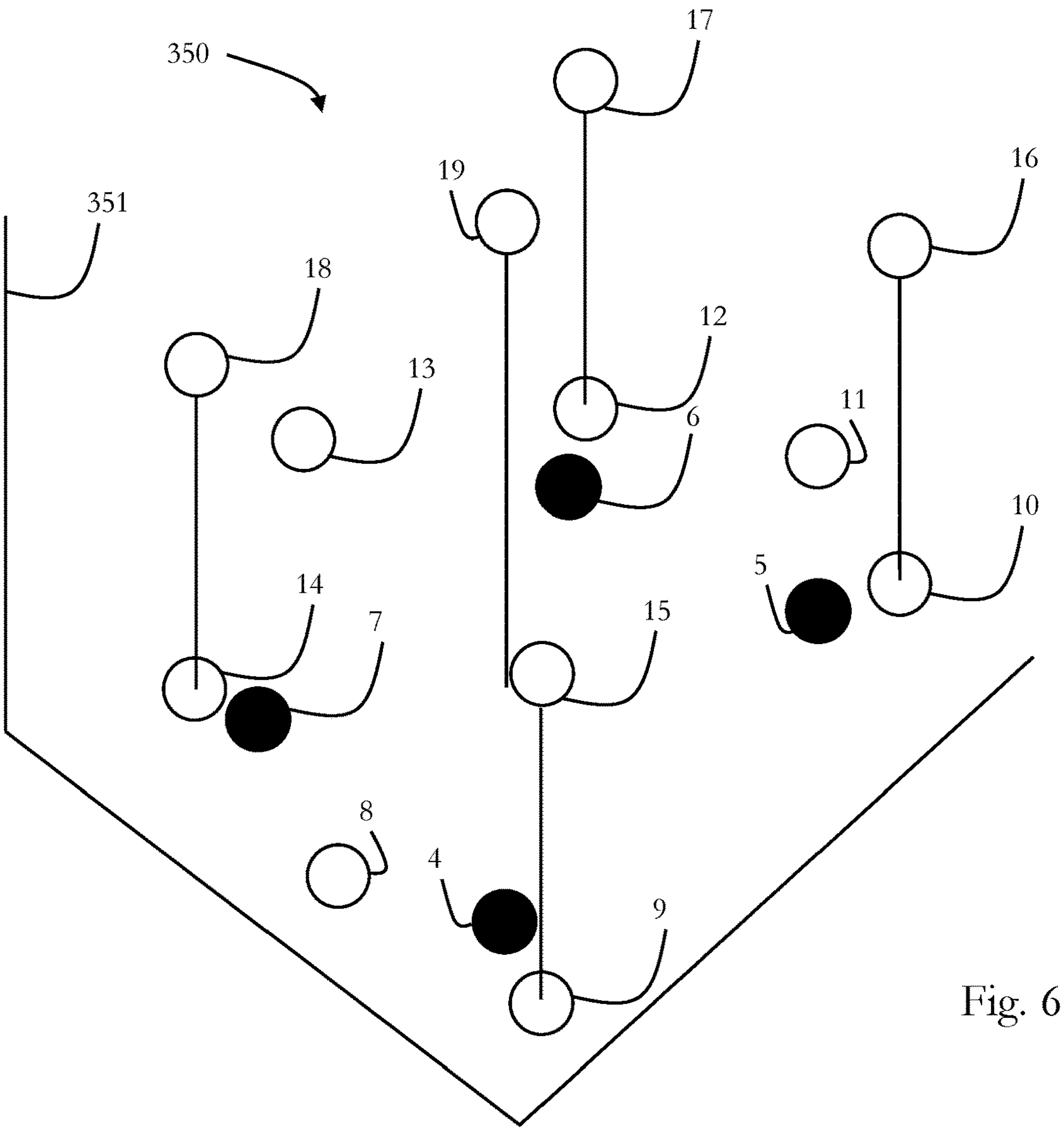
FIG. 6 shows an embodiment of an arrangement of loudspeakers generating virtual loudspeakers.

Before a detailed description of the embodiments under reference of FIG. 6 et seq. is given, some general explanations are made.

Some embodiments of the present disclosure pertain to an apparatus including circuitry configured to control a loudspeaker arrangement including at least one virtual loudspeaker and at least one real loudspeaker to generate at least one virtual sound source, wherein the at least one virtual sound source is generated based on contributions of the at least one virtual loudspeaker and the at least one real loudspeaker, and wherein a soundfield modulation function configured to generate an acoustic impression for a user is used to modulate a soundfield emitted by the virtual sound source, such that the acoustic impression is generated at a predetermined position.

The apparatus may be any apparatus which is suitable for controlling a loudspeaker arrangement, such as a processor, an amplifier, such as an electronic amplifier, such as a unilateral amplifier, bilateral amplifier, inverting amplifier, non-inverting amplifier, a servo amplifier, a linear amplifier, a nonlinear amplifier, a wideband amplifier, a radio frequency amplifier, an audio amplifier, resistive-capacitive coupled amplifier (RC), inductive-capacitive coupled amplifier (LC), transformer coupled amplifier, direct coupled amplifier, or the like. The apparatus may further be a 3D audio rendering system, such as ambisonics, wavefield synthesis systems, surround sound systems, or the like. The apparatus (circuitry) may be configured to generate a signal to perform the controlling as discussed herein, wherein this control signal may be applied to the loudspeaker arrangement or the like.

The 3D audio rendering operation may be based on wavefield synthesis, which may be used to generate a sound field that gives the impression that an audio point source is located inside a predefined space. Such an impression may be achieved by using a wavefield synthesis approach that drives a loudspeaker array, such that the impression of a virtual sound source is generated.

In some embodiments, the 3D audio rendering operation may be based on monopole synthesis The theoretical background of this technique, which is used in some embodiments, is described in more detail in patent application US 2016/0037282 A1 that is herewith incorporated by reference.

The technique, which is implemented in the embodiments of US 2016/0037282 A1 is conceptually similar to the wavefield synthesis, which uses a restricted number of acoustic enclosures to generate a defined sound field. The fundamental basis of the generation principle of the embodiments is, however, specific, since the synthesis does not try to model the sound field exactly but is based on a least square approach.

According to some embodiments, the virtual sound source has a directivity pattern. For instance, directivity is achieved by superimposing multiple monopoles, wherein the directivity may describe a change of a speaker's frequency response at off axis angles.

The circuitry of the apparatus (e.g. an electronic device) may include a processor, a memory (RAM, ROM or the like), a memory and/or storage, interfaces, etc. The circuitry may include or may be connected with input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.). Moreover, the circuitry may comprise or may be connected with sensors for sensing still images or video image data (image sensor, camera sensor, video sensor, etc.), for sensing environmental parameters (e.g. radar, humidity, light, temperature), etc.

The control signal may be generated by any part of the circuitry and may include an, electromagnetic, electronic signal, an acoustic signal, an optical signal, such as an infrared signal, a laser signal, a visible light signal, or the like. The control signal may be based or applied based on tethered technology, such as optical fiber technology, electronic technology, or the like, it may be based on wireless technology, such as Bluetooth, Wi-Fi, Wireless LAN (Local Area Network), infrared, or the like.

The loudspeaker arrangement may be a plurality of at least two individual loudspeakers, wherein the individual loudspeakers may be arbitrarily distributed in a room, several rooms, outside of a room, outside of a house, inside a vehicle, in a headphone, in a soundbar, in a television, in a radio, in a sound system, such as a stereo system, surround system, ambisonics system, 3D audio rendering system, soundfield generating system, or the like.

In some embodiments, the loudspeaker arrangement includes at least one real (physical) loudspeaker and/or at least one virtual loudspeaker, wherein the at least one virtual loudspeaker may be generated with the at least one real loudspeaker with known methods, such as amplitude panning, delaying, and the like. The at least one virtual loudspeaker may also be generated with other real loudspeakers which do not contribute to the generation of the at least one virtual sound source, or a mixture of real loudspeakers contributing to the virtual sound source and real loudspeakers not contributing to the virtual sound source.

The controlling of the loudspeaker arrangement may have the result that at least one individual loudspeaker of the loudspeaker arrangement emits a sound (or sound signal or sound wave as also used in some instances). The sound may be emitted instantaneously after the loudspeaker receives, e.g. the control signal or at a predetermined point of time. The predetermined point of time may in this context be part of the signal or part of an intrinsic programming of the at least one individual loudspeaker.

The generation of at least one virtual sound source may be based on a soundfield synthesis technology. The virtual sound source may be a soundfield, which gives the impression that a sound source is located in a predefined space. For instance, the use of virtual sound sources may allow the generation of spatially limited audio signal. The generation of a virtual sound source may be considered as a form of generation of a virtual speaker throughout the three-dimensional space, including, e.g., behind, above, or below the listener.

The contribution of the at least one virtual loudspeaker and the at least one real loudspeaker may be at least one sound signal which is emitted by the corresponding loudspeakers. Moreover, in case there is a plurality of virtual loudspeakers and real loudspeakers, only a subset of the plurality of virtual loudspeakers and/or of the real loudspeakers may contribute to the generation of the virtual sound source, wherein a subset may also be zero, i.e. the virtual sound source may only be generated by the real loudspeakers, or the like.

The soundfield modulation function may be any function influencing parameters of the soundfield, such as amplitude, frequency, phase, wave number, gain, phase, or the like. It may be a function transmitted by electric signals or acoustic signal leading to an interference of the acoustic signal and the generated soundfield. For instance, the soundfield modulation function may modulate physical parameters of a signal to generate the impression of a listener that a generated sound originates from another direction than it actually does. For example, if the position of a virtual sound source is in front of a listener, applying a soundfield modulation function may result in the acoustic perception of the listener that the sound originates from a predetermined position, such as above, below or behind the listener, or the like (although there is no (real) loudspeaker located there).

In specific, in some embodiments the soundfield modulation function may include a head related transfer function (HRTF), which may simulate the complex filtering effect of a pinna, wherein, for simplification, in some embodiment, artificial pinnae are used in order to create the HRTF. The HRTF is known per se. Moreover, in some embodiments, the HRTF is obtained/created by measuring the filtering of a pinna of an individual user or by averaging over a plurality of HRTFs of a plurality of users. Also, an artificial (dummy) head including at least one artificial pinna may be used to obtain the HRTF in one or a plurality of measurements. The HRTF may be obtained based on at least one of creating a three-dimensional model of a pinna, a computer simulation, a trial-and-error method, or the like.

In some embodiments, for simplifying the HRTF, finite impulse response (FIR) quotient filters may be applied to a virtual sound source in order to create perception of height.

Herein, virtual height may refer to a vertical direction, where the height might be positive, above some reference direction as well as negative, below some reference direction.

FIR filters may be derived by taking the quotient between the height HRTF and the corresponding HRTF at the same azimuth on the horizontal plane. For symmetry reasons, HRTFs may be derived for only one ear of a listener or a modeled head and applied with minor modifications on the second ear.

In some embodiments, infinite impulse response (IIR) quotient filters may be applied to a virtual sound source, in order to create perception of height.

In some embodiments, the soundfield modulation function includes at least one height related cue, which is used as a filter for generating the acoustic impression at a predetermined height, for example by a HRTF, or the like.

Figure 1:
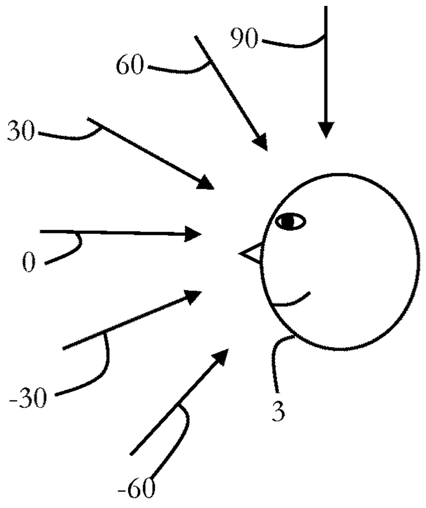
FIG. 1 is an explanatory illustration for explaining an angle related to a head related transfer function associated with a listener.

In some embodiments, the HRTF may refer to an angle of perception, i.e. the perception of a listener from which height a sound originates, which is explained under reference of FIG. 1.

FIG. 1 is an explanatory illustration for explaining an angle related to a head related transfer function associated with a listener 3.

Six arrows −60, −30, 0, 30, 60 and 90 point to the listener 3. The reference signs −60, −30, 0, 30, 60 and 90 represent the angles in which the arrows are inclined with respect to a central horizontal axis which is in parallel to the viewing axis of the listener 3, i.e. arrow 0 (−60, −30, 30, 60, 90) has an angle of zero (minus sixty, minus thirty, thirty, sixty, ninety) degree(s) with respect to this viewing axis of the listener 3. The arrows −60, −30, 0, 30, 60 and 90 represent (or are associated with) the HRTFs resulting in the perception of the listener 3 that the sound originates from an angle with which the corresponding arrow is associated, i.e. an HRTF at 30 (−60, −30, 0, 60, 90) degrees may be understood as a sound perceived as originating from that respective angle. However, the present disclosure is not limited to HRTF simulating angles of zero, thirty, sixty or ninety degrees, but, in principle, every other angle between zero and three hundred and sixty degrees may be implemented, for example 180 degrees, simulating a sound behind the listener 3, or the like, wherein negative angles may correspond to positive angles, e.g. an angle of −30 degrees may correspond to a positive angle of 330 degrees, as it is generally known.

Therefore, in some embodiments, the angle in relation to a position of the listener 3 corresponds to a height related cue, which is used as a filter for generating the acoustic impression at a predetermined height. Also, in some embodiments more than one height related cue may be used, e.g. for generating a plurality of virtual sound sources.

Also, in some embodiments, the acoustic impression at a predetermined height corresponds to a positioning of the virtual sound source at the predetermined height, i.e. the listener 3 (or any other listener) may have the acoustic impression that a sound source is located at the predetermined height.

In some embodiments, the circuitry is further configured to move the virtual sound source for improving a height perception. The moving may be generated by the apparatus, as discussed, by a (re)positioning of the virtual sound source at a position different to the predetermined position. The moving may be perceived or generated to be continuous in a predetermined pattern, random pattern, or the like, or be at discrete positions, as will also be discussed further below.

In some embodiments, the head related transfer function is specific for an individual loudspeaker of the loudspeaker arrangement. Parameters for determining the head related transfer function may be given by a manufacturer, or the like, or determined by a calibration process.

In some embodiments, the soundfield modulation function depends on the posture of a listener relative to the virtual sound source. For example, if the desired acoustic impression is that a sound is generated from behind a listener, the soundfield modulation function may be a different function, if the listener faces the virtual sound source or if the virtual sound source actually is behind the head of the listener. In the latter case, in some embodiments, a soundfield modulation function may not necessarily be applied to the virtual sound source in order to generate an acoustic impression that the sound originates from behind a listener, but it may also be applied such that an acoustic impression is generated that the sound originates in front of a listener. For example, a soundfield modulation function may be applied to the virtual sound source in order to generate an acoustic impression that a sound comes from besides, below, above the listener, or the like, which may also depend on the posture of a listener.

In some embodiments, the modulation of the soundfield depends on the position of a listener relative to the virtual sound source. For instance, if the sound is generated one meter away from the listener, the soundfield modulation function may be a different function in the case that the distance between the virtual sound source and the listener is two meters, and, e.g., may be a different function in the that the distance between the virtual sound source and the listener is three meters, etc.

Any other distances between the virtual sound source and the listeners may be realized. Moreover, any other acoustic impression distance than one meter is also possible, for example zero meters, fifty centimeters, two meters, or the like.

In some embodiments, the circuitry is further configured to generate a further virtual sound source, wherein the position of this further virtual sound source depends on the position of at least one individual loudspeaker of the loudspeaker arrangement relative to a position of a listener. For example, it may be useful to generate a virtual sound source positioned between two loudspeakers in order to provide acoustic uniformity. In this context, several virtual sound sources may be generated to provide acoustic uniformity, such that a listener may be able to move within the loudspeaker arrangement and is not fixed to a certain point.

In some embodiments the further virtual sound source is generated by horizontal/amplitude panning, whereby so-called phantom speakers may be created, in order to fill acoustic holes and to provide acoustic uniformity, for example, with vector base amplitude panning, multiple direction amplitude panning, or the like.

In some embodiments, the circuitry is further configured to adjust a signal gain for operation of an individual loudspeaker of the loudspeaker arrangement. The adjustment of the gain may be based on directivity information of a loudspeaker. The gain may be a factor or parameter for modulating an amplitude of a sound field, for modulating the amplitude or intensity only of certain frequencies of a sound emitted by an individual loudspeaker, such as the treble frequencies, the bass frequencies, the mid frequencies, or the like.

In some embodiments, the adjustment of the gain depends on the distance between a position of a listener and the virtual sound source.

For example, in some embodiments the gain may be higher (lower) if the listener is farther (closer) to the virtual sound source. On the other hand, in some embodiments the gain may be higher (lower) if the listener is closer (farther) to the virtual sound.

In the latter case, if two sound sources (e.g. individual loudspeakers or virtual sound sources or an individual speaker and a virtual sound source), especially in the case for two different types of loudspeakers (e.g. subwoofer and tweeter) of which one is closer to the listener than the other, the gain of the one sound source closer to the listener may be increased in order to create a pleasant sound impression of the listener.

In some embodiments, the circuitry is further configured to control an individual loudspeaker of the loudspeaker arrangement depending on the distance between the individual loudspeaker and the virtual sound source. For example, the individual loudspeaker may be controlled in order to generate the virtual sound source, as described herein. The individual loudspeaker may, however, also be controlled, such that a sound generated by the individual loudspeaker is modulated depending on the distance between the individual loudspeaker and the virtual sound source. For example, the gain of the sound generated by the individual loudspeaker decreases at a low distance to the virtual sound source and increases at a high distance to the virtual sound source or vice versa, without limiting the present disclosure in that regard. Moreover, other parameters, as described herein, may be modulated depending on the distance of the individual loudspeaker to the virtual sound source, such as amplitude, wave number, or the like. In some embodiments, the circuitry is further configured to determine a point of time at which the individual loudspeaker generates a sound to generate the virtual sound source, wherein the point of time may depend on the distance between the individual loudspeaker of the loudspeaker arrangement and a position of a listener. The point of time may be determined, based on a delay, as already described above.

Some embodiments pertain to a method including: controlling a loudspeaker arrangement including at least one virtual loudspeaker and at least one real loudspeaker to generate at least one virtual sound source, wherein the at least one virtual sound source is generated based on contributions of the at least one virtual loudspeaker and the at least one real loudspeaker, and wherein a soundfield modulation function configured to generate an acoustic impression for a user is used to modulate a soundfield emitted by the virtual sound source, such that the acoustic impression is generated at a predetermined position, as described herein.

In some embodiments, the method is performed on an apparatus as described above or by any other apparatus, device, processor, circuitry or the like.

In some embodiments, the soundfield modulation function includes a head related transfer function, as described herein.

In some embodiments, the soundfield modulation function includes at least one height related cue, which is used as a filter for generating the acoustic impression at a predetermined height, as discussed herein.

In some embodiments, the acoustic impression at a predetermined height corresponds to a positioning of a further virtual sound source at the predetermined height, as discussed herein.

In some embodiments, the method further includes moving the further virtual sound source, as discussed herein.

In some embodiments, the head related transfer function is specific for an individual loudspeaker of the loudspeaker arrangement, as discussed herein.

In some embodiments, the head related transfer function is obtained by averaging over a plurality of head related transfer functions, wherein each of the plurality of head related transfer function corresponds to a specific head related transfer function of an individual listener, as discussed herein.

In some embodiments, the head related transfer function is obtained by measuring an individual head related transfer function of an individual user, as discussed herein.

In some embodiments, the generation of the at least one virtual sound source at a horizontal position includes amplitude panning of the soundfield and/or delaying the soundfield, as discussed herein.

In some embodiments, the soundfield modulation function depends on the posture of a listener relative to the virtual sound source, as described herein.

In some embodiments, the modulation of the soundfield depends on the position of a listener relative to the virtual sound source, as described herein.

In some embodiments, the method includes generating a further virtual sound source depending on the position of at least one individual loudspeaker of the loudspeaker arrangement relative to a position of a listener, as described herein, In some embodiments, the further virtual sound source is generated by horizontal panning, as described herein.

In some embodiments, the method includes adjusting a signal gain for operation of an individual loudspeaker of the loudspeaker arrangement, as described herein.

In some embodiments, the adjustment of the gain depends on the distance between a position of a listener and the virtual sound source, as described herein.

In some embodiments, the method includes controlling an individual loudspeaker of the loudspeaker arrangement depending on the distance between the individual loudspeaker and the virtual sound source, as described herein.

In some embodiment, the method includes determining a point of time at which the individual loudspeaker generates a sound to generate the virtual sound source depending on the distance between an individual loudspeaker of the loudspeaker arrangement and a position of a listener, as described herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

In the following, an overview of basic embodiments is given, wherein the generation of horizontal speakers is explained under reference of FIGS. 2, 3 and 4 and the generation of virtual height speakers is explained under reference of FIG. 5.

Figure 2:
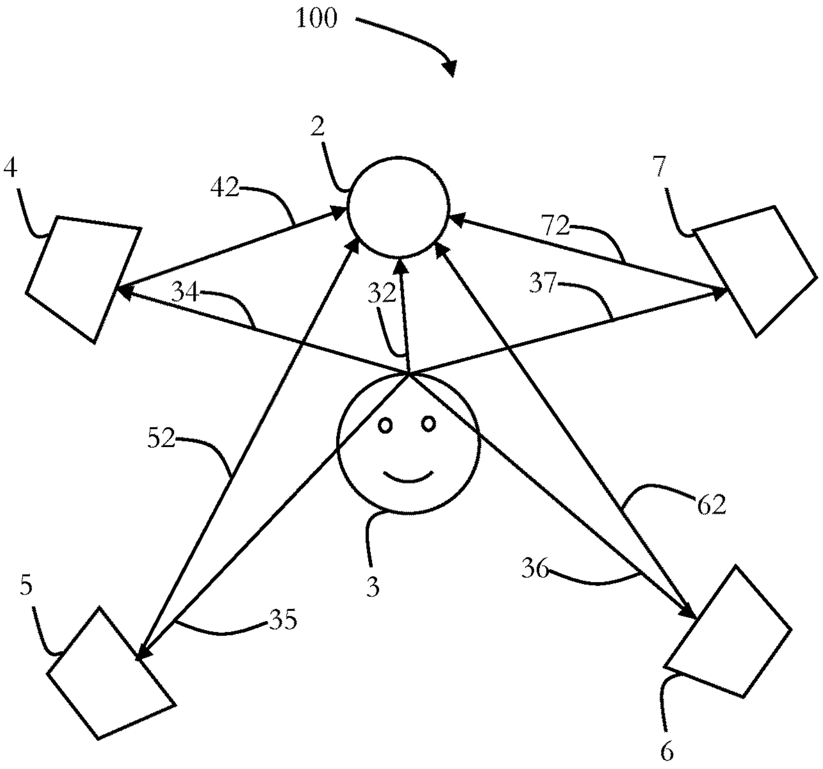
FIG. 2 is an overview of a system of loudspeakers generating a virtual sound source according to an embodiment of the present disclosure.

FIG. 2 is an overview of a system 100, including a virtual sound source 2 and a loudspeaker arrangement including loudspeakers 4, 5, 6, 7, wherein for illustrational purposes a listener 3 is depicted.

Arrows 32, 34, 35, 36, 37, 42, 52, 62, 72 indicate vectors, wherein the reference signs of the arrows indicate the beginning and the end of the respective vectors, such that an exemplary vector XY, wherein X and Y are chosen from the reference sign pool 2, 3, 4, 5, 6, 7 starts at the element with the reference sign X and ends at the element with the reference sign Y. For example, arrow 32 illustrates a vector starting at the user 3 and ending at the virtual sound source 2, arrow 35 illustrates a vector starting at the user 3 and ending at the loudspeaker 5, arrow 62 illustrates a vector starting at the loudspeaker 6 and ending at the virtual sound source 2, etc.

The virtual sound source 2 is depicted as an expanded object. However, this is only for illustrational purposes and in this embodiment, it is assumed that the virtual sound source is a point source. Therefore, the vectors 32, 42, 52, 62, 72 are considered to end in the same point, although they are depicted ending in different points.

Moreover, for illustrational purposes, a two-dimensional arrangement of the elements 2 to 7 is depicted. However, this embodiment is not limited to a two-dimensional arrangement. In general, a three-dimensional arrangement should be considered.

Furthermore, for illustrational purposes, only one virtual sound source is depicted. However, the present disclosure is not limited to one virtual sound source. Other embodiments may refer to any number of virtual sound sources larger than one.

Hence, in this embodiment, a plurality of virtual sound sources is assumed.

The number of loudspeakers is not limited to be four. It may further be 2, 3 or any number larger than 4.

To explain the formula, the variables and how they may exemplarily be retrieved are described in the following.

At first, the distances between the virtual sound source 2 and the respective loudspeakers 4 to 7 are determined by determining the norm of the associated vectors X2, wherein in this case X is an element of {4, 5, 6, 7}, resulting in the distance r:

$$r_{n,l} = \sqrt{(m_{n,x} - X_{l,x})^2 + (m_{n,y} - X_{l,y})^2 + (m_{n,z} - X_{l,z})^2}\,, \tag{1}$$

wherein the index n refers to a virtual sound source 2 of the plurality of the virtual sound sources, l refers to a loudspeaker 4 to 7 of the loudspeaker arrangement, m refers to a vector of the virtual sound source 2, X refers to a vector of a loudspeaker 4 to 7 of the loudspeaker arrangement, indexes x, y and z respectively refer to x-, y- and z-coordinates of a vector in a three-dimensional space.

For example $r_{2,5}$ may refer to the distance between the virtual sound source 2 and the loudspeaker 5, $m_{2,x}$ may refer to the x-coordinate of the virtual sound source 2, $x_{5,y}$ may refer to the y-coordinate of the loudspeaker 5, etc.

At second, gains G for each loudspeaker with respect to the virtual sound sources are determined according to equation $$G_{n,l} = \frac{1}{\sqrt{1 + r_{n,l}^2}}. \tag{2}$$

However, the present disclosure is not limited to the determination of the gains in this way and any other way to determine a gain is possible. For example, the value of the gain may be of dimensionless character or have other dimensions. It is also possible, depending on, for example, a loudspeaker type of the loudspeakers 4 to 7, to use another way of determining a gain than for other loudspeakers 4 to 7 in the same system.

At third, delays D for each loudspeaker 4 to 7 with respect to the virtual sound sources 2 are determined according to equation $$D_{n,l} = \left\lfloor \frac{r_{n,l}}{c_0 T_s} \right\rfloor, \tag{3}$$

wherein $c_0$ refers to a sound celerity and $T_S$ refers to a sampling period. However, the present disclosure is not limited to the determination of the delay in this way and any other way to determine a delay is possible. For example, the delay may not be a rounded value, the delay may be of a dimension of time, space, or the like. It is also possible, depending on, for example, a loudspeaker type of the loudspeakers 4 to 7 to use another way of determining a delay than for other loudspeakers 4 to 7 in the same system.

These first three steps may be performed iteratively for each loudspeaker 4 to 7 and for each sound source 2. However, they may only be performed for one loudspeaker, for example the loudspeaker 4, and one virtual sound source, for example the virtual sound source 2, or for a subset of loudspeakers 4 to 7 and a subset of sound sources 2. These first three steps may be performed in another ordering as well, for example exchanging the second and the third step, without limiting the present disclosure in that regard.

The fourth step may include the determining of a minimum distance $r_{n,min}$ and a maximum distance $r_{n,max}$ between a virtual sound source 2 (e.g. n=2) and the loudspeakers 4 to 7 of the loudspeaker arrangement for every virtual sound source 2.

The fifth step may be the calculation of a spread factor with the formula $$\gamma_{n,l} = 1 + \frac{r_{n,min} - r_{n,l}}{\sigma_n * (r_{n,max} - r_{n,min})}, \tag{4}$$

wherein $\sigma_n$ is a spread coefficient. The spread coefficient may in some embodiments have the property to be a positive value.

The sixth step may be a condition which is applied to $\gamma_{n,l}$, the condition including:

$$\text{If } \gamma_{n,l} > 0, \text{ then } G_{n,l} = \gamma_{n,l} * G_{n,l}, \text{ else } G_{n,l} = 0 \tag{5}$$

The fifth and sixth step may be performed iteratively for each loudspeaker 4 to 7 or to a single loudspeaker 4 or to a subset of loudspeakers of the loudspeakers 4 to 7.

For a spread coefficient $\sigma_n=1$, a result is a linear decrease of the spread factor $\gamma_{n,l}$ from $\gamma_{n,min}=1$ to $\gamma_{n,max}=0$ between the closest speaker $r_{n,min}$ and the farthest $r_{n,max}$. A larger spread coefficient with the extreme case of $\sigma_n \to \infty$ converges to identity ($\gamma_{n,l}=1$), whereas a smaller one with the extreme case of $\sigma_n=0$ increases the directivity ($\gamma_{n,l} \to -\infty$). In this latter case, only the closest loudspeaker to the source is emitting a sound ($\gamma_{n,min}=1, \gamma_{n,l \neq min} \to -\infty$, $G_{n,l \neq min}=0$).

Figure 3:
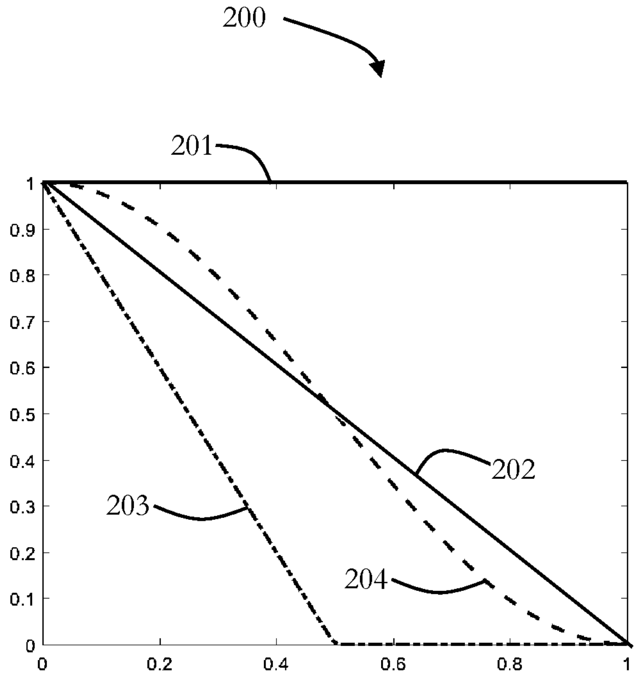
FIG. 3 is a coordinate system diagram showing different spread factors according to an embodiment of the present disclosure.

FIG. 3 is a diagram of a coordinate system 200 showing different types of spread factors $\gamma_{n,l}$ (ordinate) as functions of the normalized distance (abscissa), wherein $r_{min}$ corresponds to a distance of zero and $r_{max}$ correspond to a distance of 1.

The functions include an identity function 201, linear decrease function 202, a directive function 203 in the case that the spread coefficient is 0.5, and a cardioid function 204. The functions are not limited to be functions as displayed in this context. Any other function for the spread factor may also be derived and implemented, such as an omnidirectional function, a directional function, a superdirectional function, a bidirectional function, a figure eight function, a subcardioid function, a cardioid function, a unidirectional function, a supercardioid function, a hypercardioid function, or the like.

Figure 4:
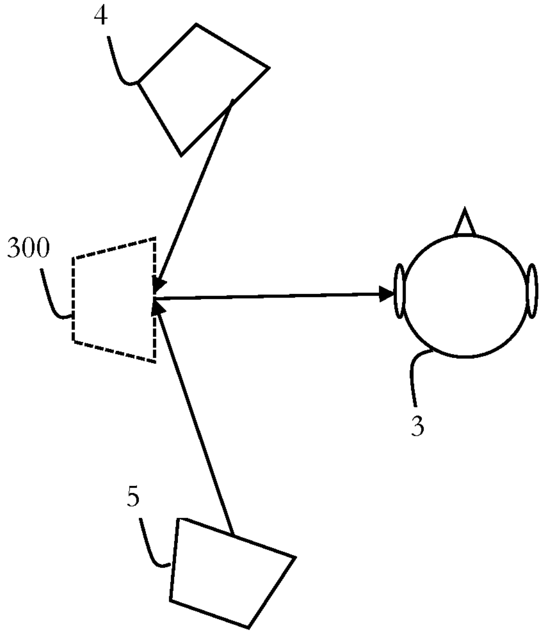
FIG. 4 illustrates generation of a virtual loudspeaker with horizontal panning between two loudspeakers.

FIG. 4 illustrates generation of a virtual loudspeaker 300 with (real) loudspeakers 4 and 5. The virtual loudspeaker 300 simulates a speaker which is left of the listener 3.

The virtual loudspeaker 300 is generated by horizontal panning, i.e. applying a gain and a delay to the sound emitted by the loudspeaker 4 and 5, thus creating a virtual sound source, as already explained under reference of FIGS. 1 and 2.

Figure 5:
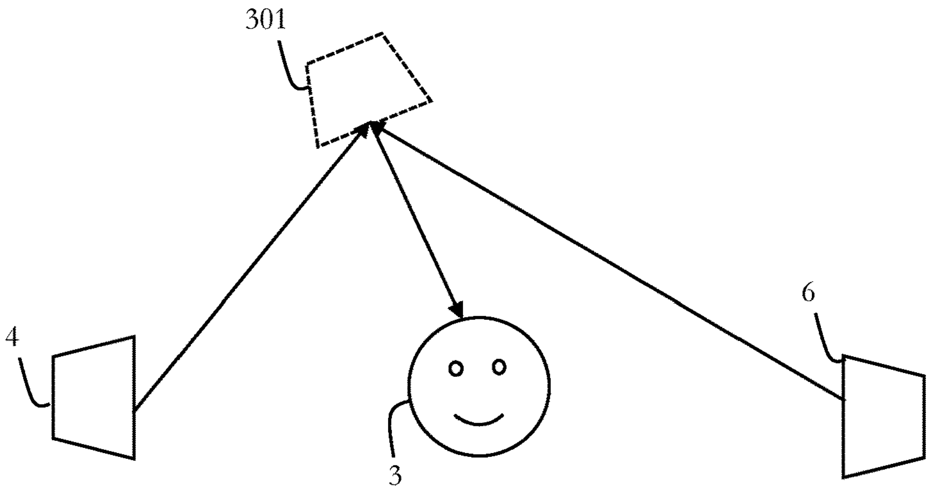
FIG. 5 illustrates generation of a virtual loudspeaker with a head related transfer function.

FIG. 5 illustrates generation of a virtual loudspeaker 301 with the loudspeakers 4 and 6. The virtual loudspeaker 301 simulates a virtual loudspeaker, which is above the listener 3. The virtual loudspeaker 301 may also be placed below the listener 3, behind the listener 3, or any other location. The virtual loudspeaker 301 is generated by applying an associated head related transfer function to the sound emitted by the speakers 4 and 6, such that the sound perceived at the position of the listener 3 causes a predefined impression (which is associated with the corresponding head related transfer function). In specific, finite impulse response (FIR) quotient filters are applied to a virtual sound source in order to generate the perception of height of the listener 3.

FIG. 6 illustrates an embodiment of an installation 350 of the loudspeakers 4, 5, 6, 7. The loudspeakers 4 to 7 are arranged in an arbitrary space illustrated by the coordinate system 351.

The loudspeakers 4 to 7 generate a plurality of virtual sound sources, herein also referred to as virtual speakers 8, 9, 10, 11, 12, 13, and 14, by horizontal panning, by calculating gains, delays, and applying spread factors, as described herein. The virtual speakers generated by horizontal panning are also referred to as phantom speakers. The main function of the phantom speakers 8 to 14 is to provide spatial uniformity of the created soundfield, especially at places where "acoustic holes" arise, such as the places where the phantom speakers 8, 11 and 13 are placed. By providing spatial uniformity, a listener, such as the listener 3 of FIG. 1, 2, 3 or 4, is able to perceive the same acoustic impression at different places of the space instead of at only one sweet spot.

Furthermore, the loudspeakers 4 to 7 generate a plurality of virtual speakers at positions above the horizontal plane at which the loudspeakers 4 to 7 are placed by applying associated head related transfer functions (HRTF) to the phantom speakers 9, 10, 12 and 14. The plurality of virtual speakers, which are generated in this way, are also referred to as virtual height speakers 15, 16, 17, 18. Assuming that the listener is placed in the center of the four loudspeakers 4 to 7, the virtual height speakers simulate the acoustic impression that a sound originates from above with an angle of 60 degrees.

The loudspeakers 4 to 7 generate one more virtual speaker 19 (also referred to as top virtual height speaker) by applying an HRTF to a virtual sound source in the center of the four loudspeakers 4 to 7 simulating an acoustic impression that a sound originates from above the listener, who is assumed to be in the center of the four loudspeakers 4 to 7, at an angle of 90 degrees, i.e. above the head of the listener.

The principle of the embodiment of FIG. 6 may also be applied in cases in which the number of loudspeakers is below or above four and for a different number of phantom speakers, virtual height speakers and top virtual height speakers. For example, in another embodiment there may be seven (five) loudspeakers as common in commercially available systems. With the principle of generating phantom speakers, virtual height speakers, also at different angles than 60 degrees, and top virtual height speakers, a space may be arbitrarily filled with sound.

Figure 7:
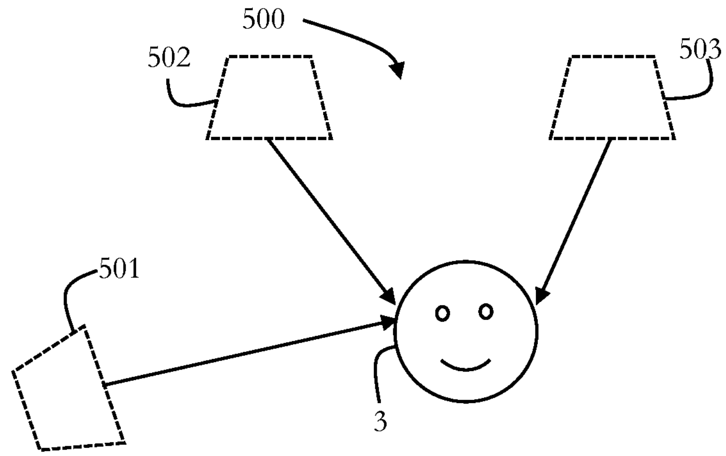
FIG. 7 shows an embodiment of how virtual height speakers are generated by applying a head related transfer function to a virtual loudspeaker.

FIG. 7 shows an embodiment of a system 500 of the present disclosure, a virtual speaker 501 and two virtual speakers 502 and 503 generated by applying an HRTF to the virtual speaker 501, wherein for illustrational purposes a listener 3 is depicted.

The virtual speaker 502 simulates a sound originating from a right reference direction of the listener 3, whereas the virtual speaker 503 simulates a sound originating from a left reference direction of the listener 3.

Figure 8:
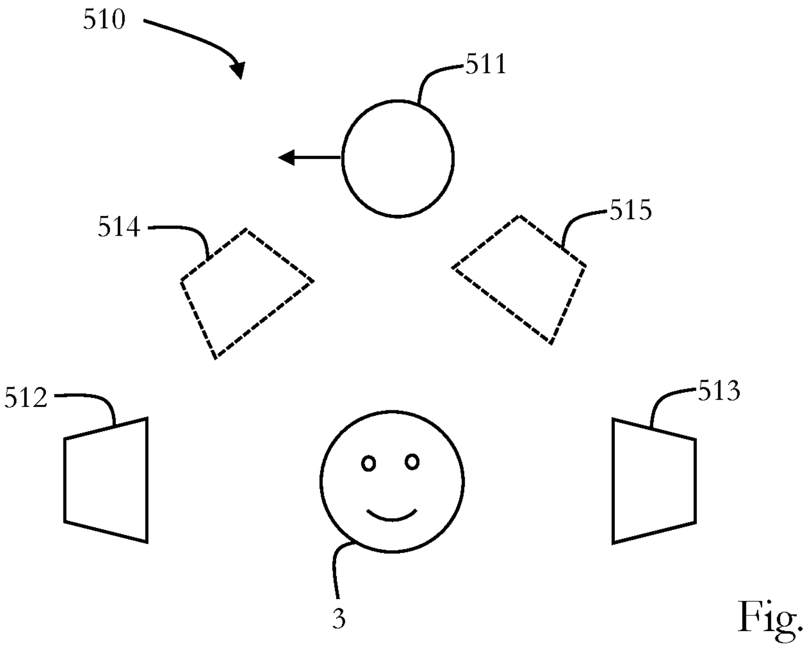
FIG. 8 shows an embodiment of a system including loudspeakers, virtual loudspeakers and a moving virtual sound source.

FIG. 8 shows an embodiment of a system 510 of the present disclosure. The system 510 includes a virtual sound source 511, two loudspeakers 512 and 513, and two virtual loudspeakers 514 and 515, which are generated by the applying HRTF quotient filters to the loudspeakers 512 and 513, wherein a for illustrational purposes a listener 3 is depicted. The virtual sound source 511 is moving (indicated by an arrow), influencing the listener's directional perception of the sound originating from the virtual sound source. The movement of the virtual sound source influences the sound generated by the two virtual loudspeakers 514 and 515.

The HRTF quotient filters are excited with different gains and delays resulting from the current position of the virtual sound source 511 while the virtual sound source 511 is moving, providing different binaural height cues to the listener 3. In some embodiments, the amplitude and speed variation of the movement might be variable and depending on the number of virtual speakers. In some embodiment, the amplitude and speed variation of the movement might be random, whereas in other embodiments spatial continuity may be implemented. In other embodiments, the virtual sound source 511 may move in the shape of a disc or a circle around a center position, simulating head rotation, for example. In other embodiments, the position of the virtual sound source 511 may be chosen from a table of predefined positions.

For example, in this embodiment it is possible to simulate the movement of the listener's 3 head by moving the monopole source 511. It is also possible to simulate a perception of movement of an object to the listener 3, for example the flight of a bird, or the like.

Figure 9:
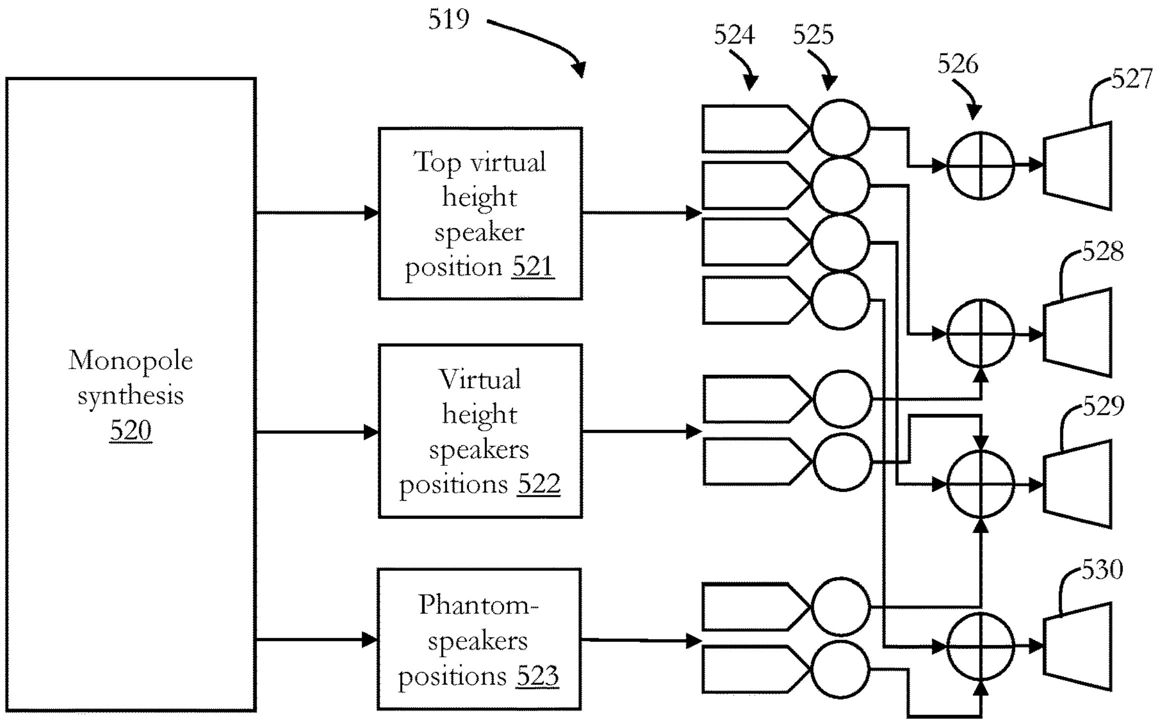
FIG. 9 is a diagram of a method for determining functions which are applied to loudspeakers in order to generate virtual loudspeakers.

A method 519 for controlling a loudspeaker arrangement is described with reference to FIG. 9. The method is based on the monopole synthesis algorithm 520, as will be described with reference to FIG. 11.

At 521, 522 and 523 the positions of the top virtual height speaker, virtual height speakers and phantom speakers, as described with reference to FIG. 6, are explicated.

Additionally, at 521 HRTF quotients for the determined position of the top virtual height speaker are determined, and at 522 HRTF quotients for the determined positions of the virtual height speakers are determined.

At 524, delays are determined according to the determined positions of 521 to 523.

At 525, gains are determined according to the determined positions of 521 and 523.

At 526, the parameters determined at 520 to 525 are applied to individual loudspeakers 527, 528, 529, 530.

In this embodiment, the associated delays and gains for generating the top virtual height speakers are applied to all individual loudspeakers 527 to 530, the associated delays and gains for generating the virtual height speakers are applied to the loudspeakers 528 and the associated delays and gains for generating the phantom speakers are applied to the speakers 529 and 530. This means that the top virtual height speaker is generated by all loudspeakers 527 to 530, the virtual height speakers are generated by the loudspeakers 528 and 529 and the phantom speakers are generated by the loudspeakers 529 and 530.

In other embodiments, the top virtual height speaker, the virtual height speakers and the phantom speakers are generated by any suitable combination of the loudspeakers 527 to 530.

Other embodiments provide more than four loudspeakers generating or less than four loudspeakers while generating other combinations of virtual loudspeakers.

Figure 10:
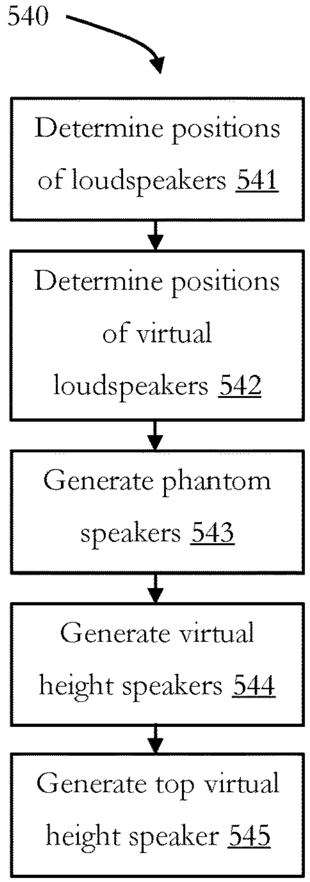
FIG. 10 is a diagram of a method for generating a set of virtual loudspeakers.

In the following, a method 540 for generating a set of virtual loudspeakers is described under reference of FIG. 10 show a flowchart.

At 541, the positions of loudspeakers of a loudspeaker arrangement are determined.

At 542, the positions of virtual loudspeakers are determined depending on the determined positions of 541.

At 543, phantom speakers are generated by horizontal panning, i.e. calculating associated delays, gains and spread factors, as described herein.

At 544, virtual height speakers are generated by applying HRTFs to the phantom speakers and/or the loudspeakers.

At 545, a top virtual height speaker is generated as a virtual sound source by applying an HRTF to the phantom speakers and/or the loudspeakers.

Figure 11:
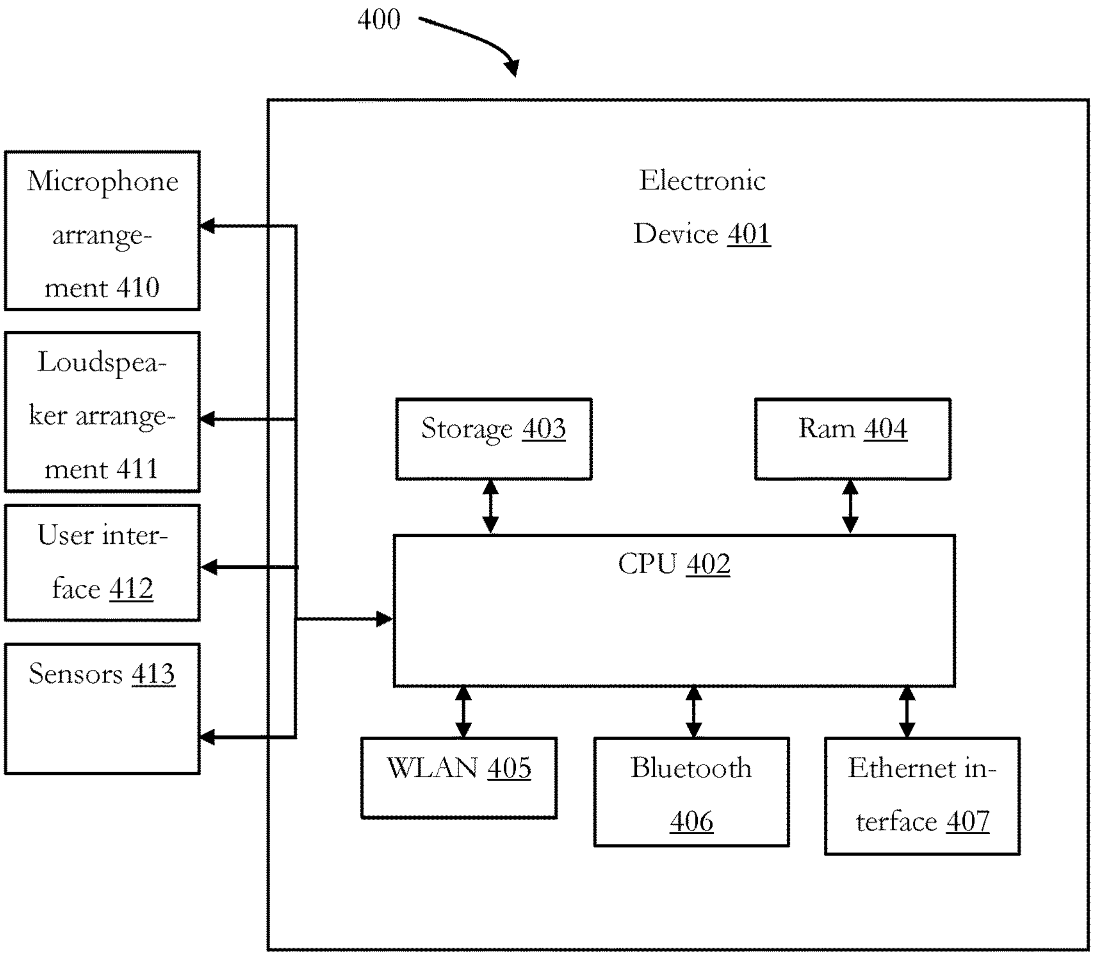
FIG. 11 depicts an electronic device for an audio system according to an embodiment of the present disclosure.

In the following an embodiment of an apparatus is discussed under reference of FIG. 11, which depicts a block diagram of an apparatus implemented as an audio system 400 (or optionally as electronic device 401). The apparatus may be included in a car, a smartphone, a sound system, or the like.

The audio system 400 comprises an electronic device 401 that is connected to a microphone arrangement 410, a speaker arrangement 411, a user interface 412, and sensor 413. The electronic device 401 is a 3D sound rendering system in this embodiment.

The electronic device 401 has a CPU 402 as processor, a data storage 403 and a data memory 404 (here a RAM).

The data memory 404 is arranged to temporarily store or cache data and/or computer instructions for processing by the processor 402.

The data storage 403 is provided for storing record sensor data obtained from e.g. the microphone arrangement 410.

The electronic device 401 is configured to execute software for a 3D audio rendering operation, which virtually places a sound source anywhere inside a room, including behind, above or below a listener, such as listener 3 of FIG. 1.

The electronic device 401 has a WLAN interface 405, a Bluetooth interface 406, and an Ethernet interface 407. These interfaces 405, 406, 407 act as I/O interfaces for data communication with external devices.

For example, a smartphone may be connected to the 3D sound rendering system by means of the Bluetooth interface 406 and/or the WLAN interface 405. Additional loudspeakers, microphones, and video cameras with Ethernet, WLAN or Bluetooth connection may be coupled to the electronic device 401 via these wireless/wire interfaces 405, 406, and 407.

The microphone arrangement 410 may be composed of one or more microphones distributed around a listener, for example.

The user interface 412 is connected to the processor 402. The user interface 412 acts as a human-machine interface and allows for a dialogue between an administrator and the audio system 400.

The sensors 413 are connected to the processor 402. The sensors 413 include a temperature sensor and a video camera. In other embodiments, the sensors include a GPS sensor or other positioning sensors, and/or acceleration sensors, or the like. The sensors 413 are configured to obtain the presence and the position of one or more listeners and a head position and orientation of the listener. Moreover, the sensors 413 are configured to obtain the position and orientation of the loudspeaker arrangement 411. The video cameras may be distributed over a predefined space, or a single camera can be used to obtain an image.

In some embodiments, the sensors further comprise at least one external microphone placed in at least one ear of a user and/or a camera configured to acquire at least one photo of at least one ear of the user to determine at least parameters for determining the HRTF:

The audio system 400, by means of microphone array 410, receives audio data from the loudspeakers of the loudspeaker arrangement 411 and at least one virtual sound source (e.g. virtual sound source 2, FIG. 1) in order to monitor the generated virtual sound sources (e.g. virtual sound source 2, FIG. 1) and, if necessary, to regulate the loudspeaker arrangement 411 for influencing the generated virtual sound source(s).

Figure 12:
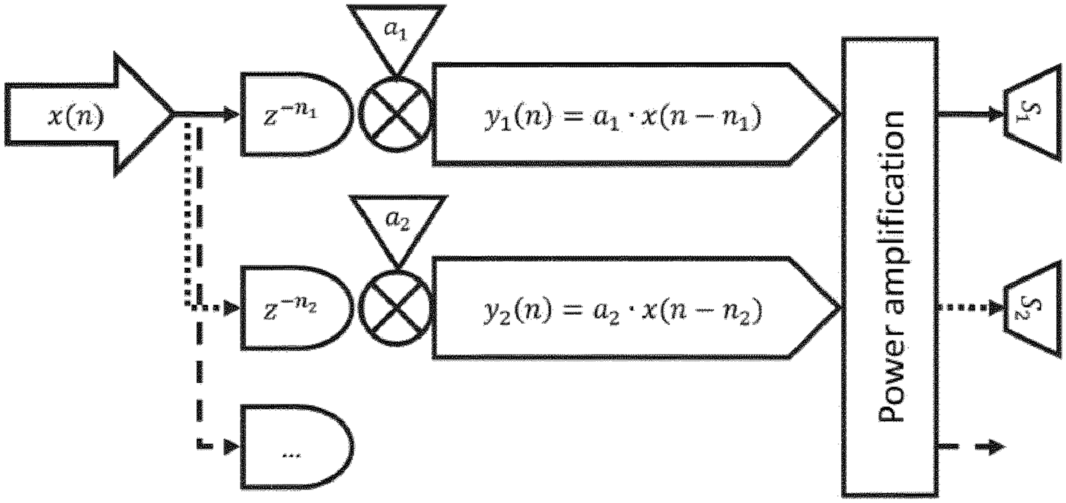
FIG. 12 provides an embodiment of a 3D audio rendering that is based on a digitalized Monopole Synthesis algorithm.

In some embodiments, a 3D audio rendering is implemented which is based on a digitalized Monopole Synthesis algorithm, which is discussed under reference of FIG. 12 in the following.

The theoretical background of this technique, which is used in some embodiments, is described in more detail in patent application US 2016/0037282 A1 that is herewith incorporated by reference.

The technique, which is implemented in the embodiments of US 2016/0037282 A1 is conceptually similar to the wavefield synthesis, which uses a restricted number of acoustic enclosures to generate a defined sound field. The fundamental basis of the generation principle of the embodiments is, however, specific, since the synthesis does not try to model the sound field exactly but is based on a least square approach.

A target sound field is modelled as at least one target monopole placed at a defined target position. In one embodiment, the target sound field is modelled as one single target monopole. In other embodiments, the target sound field is modelled as multiple target monopoles placed at respective defined target positions. For example, each target monopole may represent a noise cancellation source comprised in a set of multiple noise cancelation sources positioned at a specific location within a space. The position of a target monopole may be moving. For example, a target monopole may adapt to the movement of a noise source to be attenuated. If multiple target monopoles are used to represent a target sound field, then the methods of synthesizing the sound of a target monopole based on a set of defined synthesis monopoles as described below may be applied for each target monopole independently, and the contributions of the synthesis monopoles obtained for each target monopole may be summed to reconstruct the target sound field.

A source signal x(n) is fed to delay units labelled by $z^{-n_p}$ and to amplification units $a_p$, where p=1, . . . , N is the index of the respective synthesis monopole used for synthesizing the target monopole signal. The delay and amplification units according to this embodiment may apply equation (117) of reference US 2016/0037282 A1 to compute the resulting signals $y_p$ (n)=$s_p$ (n) which are used to synthesize the target monopole signal. The resulting signals $s_p$ (n) are power amplified and fed to loudspeaker $S_p$.

In this embodiment, the synthesis is thus performed in the form of delayed and amplified components of the source signal x.

According to this embodiment, the delay $n_p$ for a synthesis monopole indexed p is corresponding to the propagation time of sound for the Euclidean distance $r=R_{p0}=|r_p-r_o|$ between the target monopole $r_o$ and the generator $r_p$.

Further, according to this embodiment, the amplification factor $$a_p = \frac{\rho c}{R_{p0}}$$

is inversely proportional to the distance $r=R_{p0}$.

In alternative embodiments of the system, the modified amplification factor according to equation (118) of reference US 2016/0037282 A1 can be used.

Figure 13:
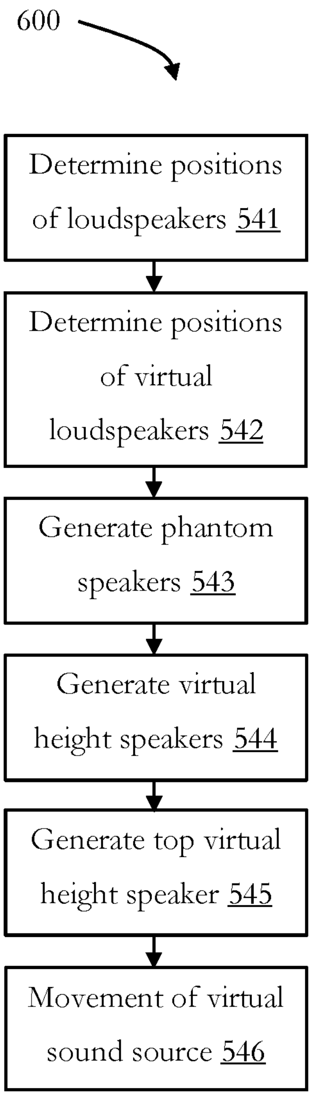
FIG. 13 is a diagram of a method for generating a set of virtual loudspeakers and for moving a virtual sound source.

FIG. 13 shows a method 600 according to an embodiment of the present disclosure. Generally, the method 600 is based on the method 540, as described herein. Therefore, repetitive explanation of reference signs 541 to 545 is omitted.

After 545, the method 600 further includes, in 546, a movement of the virtual sound source. In this embodiment, the movement is an oscillating movement of the virtual sound source, which leads to a listener's more natural, and, thus improved (height) perception of the sound emitted by the top virtual height speaker.

Figure 14:
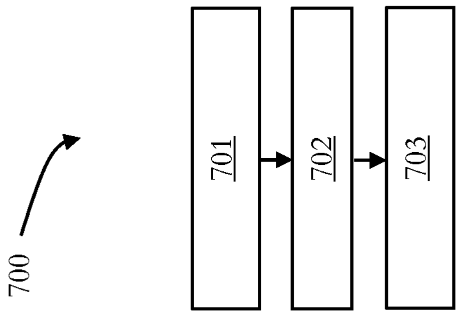
FIG. 14 is a diagram of a method according to the present disclosure.

FIG. 14 shows a method 700 for controlling a loudspeaker arrangement according to the present disclosure.

In 701, the method includes controlling a loudspeaker arrangement including virtual loudspeakers and real loudspeakers to generate at least one virtual sound source, wherein the at least one virtual sound source is generated based on contributions of the virtual loudspeakers and the real loudspeakers, and wherein a soundfield modulation function configured to generate an acoustic impression for a user is used to modulate a soundfield emitted by the virtual sound source, such that the acoustic impression is generated at a predetermined position, as described herein.

In this embodiment, the soundfield modulation function includes a head related transfer function, as described herein. The head related transfer function further includes a height related cue, which is used as a filter for generating the acoustic impression at a predetermined height. This corresponds to a positioning of the virtual sound source at the predetermined height, as discussed herein. Also, the head related transfer function is specific for an individual loudspeaker of the loudspeaker arrangement.

As already discussed herein, in some embodiments, the head related transfer function is obtained by measuring an individual head related transfer function of a user or of a dummy head. However, in this embodiment, the head related transfer function is obtained by averaging over a plurality of (known) head related transfer functions, wherein each of the plurality of head related transfer functions corresponds to a specific head related transfer function of an individual listener.

Furthermore, the generation of the at least one virtual sound source at a horizontal position includes (at least one of) amplitude panning of the soundfield and delaying the soundfield.

In 702, the method further includes moving the virtual sound source, as discussed herein.

In 703, the method further includes adjusting a signal gain for operation of an individual loudspeaker of the loudspeaker arrangement, as discussed herein.

It should be recognized that the embodiments describe methods with an exemplary ordering of method steps. The specific ordering of method steps is however given for illustrative purposes only and should not be construed as binding. For example the ordering of 524 and 525 in the embodiment of FIG. 9 may be exchanged. Also, the ordering of 543, 544 and 545 in the embodiment of FIG. 10 may be exchanged. Other changes of the ordering of method steps may be apparent to the skilled person.

Please note that the division of the electronic device into units 403 to 407 is only made for illustration purposes and that the present disclosure is not limited to any specific division of functions in specific units. For instance, the control 401 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus including circuitry configured to control a loudspeaker arrangement including at least one virtual loudspeaker and at least one real loudspeaker to generate at least one virtual sound source, wherein the at least one virtual sound source is generated based on contributions of the at least one virtual loudspeaker and the at least one real loudspeaker, and wherein a soundfield modulation function configured to generate an acoustic impression for a user is used to modulate a soundfield emitted by the virtual sound source, such that the acoustic impression is generated at a predetermined position.

(2) The apparatus of (1), wherein the soundfield modulation function includes a head related transfer function.

(3) The apparatus of (1) or (2), wherein the soundfield modulation function includes at least one height related cue, which is used as a filter for generating the acoustic impression at a predetermined height.

(4) The apparatus of anyone of (1) to (3), wherein the acoustic impression at a predetermined height corresponds to a positioning of the virtual sound source at the predetermined height.

(5) The apparatus of anyone of (1) to (4), wherein the circuitry is further configured to move the virtual sound source for improving a height perception.

(6) The apparatus of anyone of (1) to (5), wherein the head related transfer function is specific for an individual loudspeaker of the loudspeaker arrangement.

(7) The apparatus of anyone of (1) to (6), wherein the head related transfer function is obtained by averaging over a plurality of head related transfer functions, wherein each of the plurality of head related transfer function corresponds to an individual head related transfer function of an individual listener.

(8) The apparatus of anyone of (1) to (7), wherein the head related transfer function is obtained by measuring an individual head related transfer function of an individual user.

(9) The apparatus of anyone of (1) to (8), wherein the generation of the at least one virtual sound source at a horizontal position includes at least one of amplitude panning of the soundfield and delaying the soundfield.

(10) The apparatus of anyone of (1) to (9), wherein the circuitry is further configured to adjust a signal gain for operation of an individual loudspeaker of the loudspeaker arrangement.

(11) A method, comprising:

controlling a loudspeaker arrangement including at least one virtual loudspeaker and at least one real loudspeaker to generate at least one virtual sound source, wherein the at least one virtual sound source is generated based on contributions of the at least one virtual loudspeaker and the at least one real loudspeaker, and wherein a soundfield modulation function configured to generate an acoustic impression for a user is used to modulate a soundfield emitted by the virtual sound source, such that the acoustic impression is generated at a predetermined position.

(12) The method of (11), wherein the soundfield modulation function includes a head related transfer function.

(13) The method of anyone of (11) or (12), wherein the soundfield modulation function includes at least one height related cue, which is used as a filter for generating the acoustic impression at a predetermined height.

(14) The method of anyone of (11) to (13), wherein the acoustic impression at a predetermined height corresponds to a positioning of the virtual sound source at the predetermined height.

(15) The method of anyone of (11) to (14), further comprising moving the virtual sound source for improving a height perception.

(16) The method of anyone of (11) to (15), wherein the head related transfer function is specific for an individual loudspeaker of the loudspeaker arrangement.

(17) The method of anyone of (11) to (16), wherein the head related transfer function is obtained by averaging over a plurality of head related transfer functions, wherein each of the plurality of head related transfer function corresponds to a specific head related transfer function of an individual listener.

(18) The method of anyone of (11) to (17), wherein the head related transfer function is obtained by measuring an individual head related transfer function of an individual user.

(19) The method of anyone of (11) to (18), wherein the generation of the at least one virtual sound source at a horizontal position includes at least one of amplitude panning of the soundfield and delaying the soundfield.

(20) The method of anyone of (11) to (19), further comprising.

adjusting a signal gain for operation of an individual loudspeaker of the loudspeaker arrangement.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. An apparatus comprising circuitry configured to:

control a loudspeaker arrangement including at least one virtual loudspeaker and at least one real loudspeaker to generate at least one virtual sound source, the at least one virtual sound source being generated based on contributions of the at least one virtual loudspeaker and the at least one real loudspeaker;

modulate a sound field emitted by the virtual sound source using a modulation function to generate an acoustic impression for a user, such that the acoustic impression is generated at a predetermined position; and move the virtual sound source for improving a height perception.

2. The apparatus of claim 1, wherein the sound field modulation function includes a head related transfer function.

3. The apparatus of claim 2, wherein the head related transfer function is specific for an individual loudspeaker of the loudspeaker arrangement.

4. The apparatus of claim 2, wherein the head related transfer function is obtained by averaging over a plurality of head related transfer functions, and each of the plurality of head related transfer functions corresponds to an individual head related transfer function of an individual listener.

5. The apparatus of claim 2, wherein the head related transfer function is obtained by measuring an individual head related transfer function of an individual user.

6. The apparatus of claim 1, wherein the sound field modulation function includes at least one height related cue, which is used as a filter for generating the acoustic impression at a predetermined height.

7. The apparatus of claim 6, wherein the acoustic impression at a predetermined height corresponds to a positioning of the virtual sound source at the predetermined height.

8. The apparatus of claim 1, wherein the generation of the at least one virtual sound source at a horizontal position includes at least one of amplitude panning of the sound field and delaying the sound field.

9. The apparatus of claim 1, wherein the circuitry is further configured to adjust a signal gain for operation of an individual loudspeaker of the loudspeaker arrangement.

10. The apparatus of claim 1, wherein the modulation function is implemented by a finite impulse response (FIR) filter.

11. A method, comprising:

controlling a loudspeaker arrangement including at least one virtual loudspeaker and at least one real loudspeaker to generate at least one virtual sound source, the at least one virtual sound source being generated based on contributions of the at least one virtual loudspeaker and the at least one real loudspeaker;

modulating a sound field emitted by the virtual sound source using a sound field modulation function to generate an acoustic impression for a user, such that the acoustic impression is generated at a predetermined position; and moving the virtual sound source for improving a height perception.

12. The method of claim 11, wherein the sound field modulation function includes a head related transfer function.

13. The method of claim 12, wherein the head related transfer function is specific for an individual loudspeaker of the loudspeaker arrangement.

14. The method of claim 12, wherein the head related transfer function is obtained by averaging over a plurality of head related transfer functions, and each of the plurality of head related transfer functions corresponds to a specific head related transfer function of an individual listener.

15. The method of claim 12, wherein the head related transfer function is obtained by measuring an individual head related transfer function of an individual user.

16. The method of claim 11, wherein the sound field modulation function includes at least one height related cue, which is used as a filter for generating the acoustic impression at a predetermined height.

17. The method of claim 16, wherein the acoustic impression at a predetermined height corresponds to a positioning of the virtual sound source at the predetermined height.

18. The method of claim 11, wherein the generation of the at least one virtual sound source at a horizontal position includes at least one of amplitude panning of the sound field and delaying the sound field.

19. The method of claim 11, further comprising adjusting a signal gain for operation of an individual loudspeaker of the loudspeaker arrangement.

20. A non-transitory computer-readable medium encoded with computer-readable instructions that, when executed by processing circuitry, cause the processing circuitry to perform a method comprising:

controlling a loudspeaker arrangement including at least one virtual loudspeaker and at least one real loudspeaker to generate at least one virtual sound source, the at least one virtual sound source being generated based on contributions of the at least one virtual loudspeaker and the at least one real loudspeaker;

modulating a sound field emitted by the virtual sound source using a sound field modulation function to generate an acoustic impression for a user, such that the acoustic impression is generated at a predetermined position; and moving the virtual sound source for improving a height perception.

* * * * *